United States Patent
Burnes

(10) Patent No.: US 10,359,318 B2
(45) Date of Patent: Jul. 23, 2019

(54) RADIO FREQUENCY STIMULATED BLACKBODY WITH VACUUM AND CRYOGENIC CAPABILITY

(71) Applicant: Raytheon Company, Waltham, MA (US)

(72) Inventor: Clifford S. Burnes, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 1722 days.

(21) Appl. No.: 13/722,990

(22) Filed: Dec. 20, 2012

(65) Prior Publication Data

US 2014/0175082 A1    Jun. 26, 2014

(51) Int. Cl.
G01J 5/52 (2006.01)
G01J 5/08 (2006.01)
G01J 5/06 (2006.01)
G01J 1/58 (2006.01)

(52) U.S. Cl.
CPC ............... *G01J 5/522* (2013.01); *G01J 1/58* (2013.01); *G01J 5/061* (2013.01); *G01J 5/0896* (2013.01)

(58) Field of Classification Search
CPC ........... G01J 5/522; G01J 5/524; G01J 5/0896
See application file for complete search history.

(56) References Cited

U.S. PATENT DOCUMENTS

| | | | | |
|---|---|---|---|---|
| 5,902,510 A * | 5/1999 | Balbaa | ............... | H05B 6/78 219/698 |
| 6,043,861 A * | 3/2000 | Davis | ............... | G02F 1/1326 349/115 |
| 6,179,466 B1 * | 1/2001 | Peuse | ............... | G01J 5/0003 374/110 |
| 6,365,877 B1 * | 4/2002 | Chen | ............... | F27B 17/00 219/400 |
| 2002/0005406 A1 * | 1/2002 | Fukunaga | ............... | H05B 6/6455 219/711 |
| 2002/0021739 A1 * | 2/2002 | Fraden | ............... | G01J 5/522 374/2 |

(Continued)

OTHER PUBLICATIONS

SkyMall's Bacon Genie Makes Absolutely No Sense Jul. 30, 2009 at 4:11 PM | by Omri http://www.jaunted.com/story/2009/7/30/144249/673/travel/SkyMall's+Bacon+Genie+Makes+Absolutely+No+Sense.*

*Primary Examiner* — Nicole M Ippolito
*Assistant Examiner* — Sean M Luck

(57) ABSTRACT

A non-contact system and heating method includes a blackbody core heated according to Molecular Resonant Wavelength-Radio Frequency Heating method. Radio frequency waves of a resonant frequency travel in a hollow channel of a waveguide that contains an object, such as a blackbody core. The core is structurally secured within the waveguide by a spring system that supports the base of the core, yet the core does not touch the waveguide and does not conduct heat to the waveguide. The core absorbs the RF energy and generates heat by molecular friction within the material of the core moving in a resonating pendulumatic fashion. The core converts the RF energy to infrared (IR) energy and emits IR waves through an exit aperture disposed within a hood coupled to the waveguide. A non-contact temperature measurement system measures the temperature of the core, such as using a phosphor decay temperature measurement method.

29 Claims, 14 Drawing Sheets

(56) References Cited

U.S. PATENT DOCUMENTS

| | | | |
|---|---|---|---|
| 2003/0102307 A1* | 6/2003 | Kang | H05B 6/6402 219/746 |
| 2007/0023971 A1* | 2/2007 | Saha | A61C 13/203 264/432 |
| 2007/0272684 A1* | 11/2007 | Lee | H05B 6/74 219/749 |
| 2007/0287913 A1* | 12/2007 | Regni | A61B 5/05 600/439 |
| 2009/0321427 A1* | 12/2009 | Hyde | H05B 6/6455 219/702 |

* cited by examiner

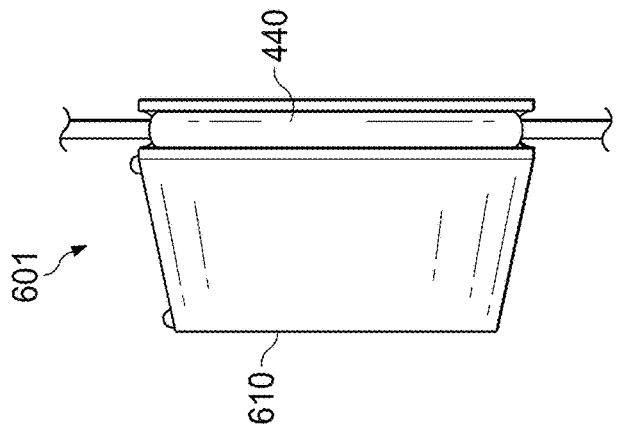
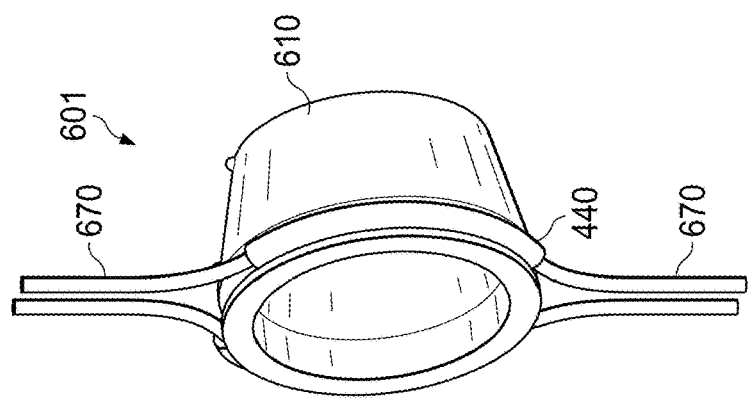
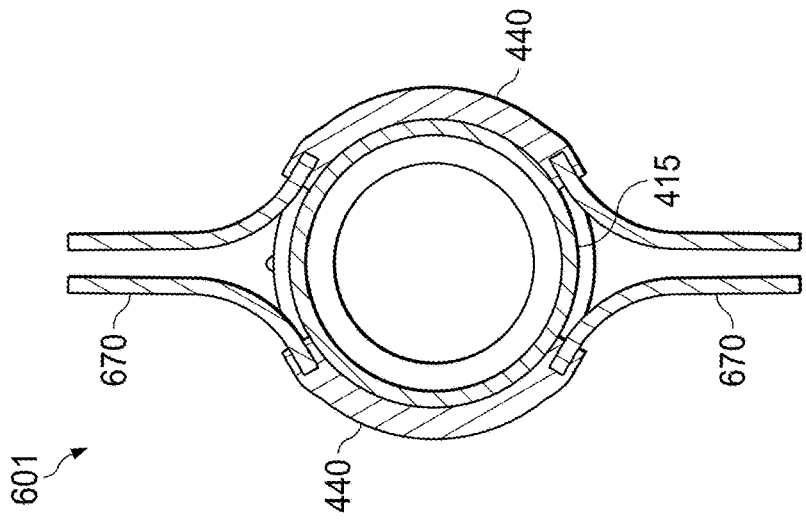
FIG. 6F
FIG. 6E
FIG. 6D

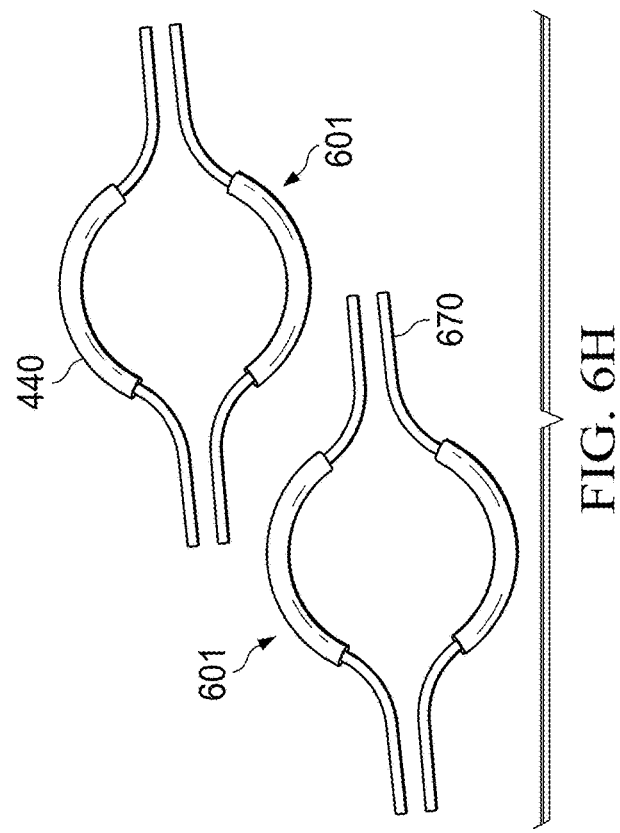
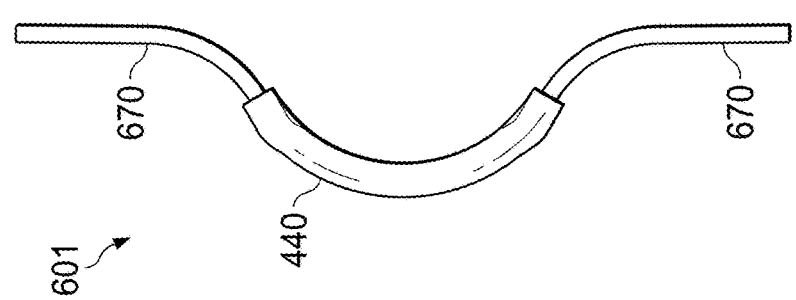

RADIO FREQUENCY STIMULATED BLACKBODY WITH VACUUM AND CRYOGENIC CAPABILITY

TECHNICAL FIELD

This disclosure is generally directed to a blackbody radiation source. More specifically, this disclosure is directed to a blackbody radiation source for calibrating space-based infrared seekers.

BACKGROUND

Electric power lines, mammal bodies, vehicle engines, and aircraft are examples of the many living organisms and objects that produce and retain heat. These objects and bodies are visible in the infrared wavelengths of light compared to objects in the background because hot bodies strongly radiate infrared waves. The objects in the background are those relatively cooler objects surrounding the hot body.

Missile guidance systems track and follow a target using an infrared seeker to locate the infrared emissions from the target. The infrared seeker, also referred to as a heat seeker, includes infrared temperature sensors and is calibrated to identify temperature of an object from the color of the object in an infrared photograph.

For space based system, a cryogenic vacuum chamber simulates space conditions. Cryogenic blackbody cores are used to characterize or calibrate infrared seekers. Teaching, characterizing, and calibrating an infrared seeker to record what specific color represents a specific temperature involves several steps. A cryogenic blackbody core is heated. Then a temperature sensor reads the temperature of the heated blackbody core. An infrared camera takes a photograph of the heated blackbody core and displays colors according to the temperature of the blackbody. The infrared seeker memory is programmed to store a color-temperature association between the measured temperature and the color of the object on the infrared photograph. The infrared seeker is programmed to know that the color displayed by the blackbody core corresponds to the temperature read by the temperature sensor.

SUMMARY

This disclosure provides a non-contact system for heating an object, such as a blackbody core. This disclosure also provides a blackbody system heated according to the Molecular Resonance Radio Frequency Wavelength Heating Method of the present disclosure.

In a first embodiment, an apparatus includes a blackbody. The black body includes a waveguide designed to propagate radio frequency (RF) waves of a specified wavelength and specified frequency. The waveguide includes a hollow propagation channel. The apparatus also includes an emitting core disposed in a fixed location within the hollow propagation channel of the waveguide. The emitting core is configured to receive the RF waves incident upon the emitting core. The emitting core generates heat to a specified temperature, to convert RF energy to infrared energy (IR), and to emit IR waves. The apparatus further includes a spring system configured to encircle a base of the emitting core and mount the emitting core in the fixed location within the hollow propagation channel of the waveguide. The spring system also prevents a transfer of heat from the emitting core to the waveguide by conduction.

In a second embodiment, a non-contact method for heating an object includes propagating RF waves of a specified wavelength and specified frequency. The method includes receiving the RF waves incident upon the object. In response to receiving the RF waves, the method includes generating heat within the object to a temperature corresponding to a frequency of the RF waves and to the material of the object. The method includes converting RF energy to IR energy, and emitting IR waves from the object. The object does not transfer heat to the waveguide by conduction. Additionally, a molecular resonant frequency of the RF waves corresponds to a material of which the object is composed.

In a third embodiment, a non-contact method for heating an emitting core includes propagating RF waves of a specified wavelength and specified frequency in a waveguide. The waveguide includes a hollow propagation channel. The method includes receiving the RF waves incident upon the emitting core, wherein the emitting core is disposed in a fixed location within the hollow propagation channel of the waveguide. In response to receiving the RF waves, the method includes generating heat, by the emitting core, to a temperature corresponding to a frequency the RF waves. The method also includes converting RF energy to infrared energy by the emitting core, and emitting infrared waves from the emitting core. The method further includes preventing, by a low thermal conductance spring clamping system, a transfer heat from the emitting core to the waveguide by conduction. The spring system is configured to clasp and mount the emitting core in the fixed location within the waveguide's hollow propagation channel. The resonant frequency of the RF waves correspond to the material of the emitting core.

Certain embodiments may provide various technical advantages depending on the implementation. For example, a technical advantage of some embodiments may include the capability to heat an object, such as a blackbody core. A technical advantage of other embodiments may include the capability to provide a blackbody system heated according to the Molecular Resonant RF Wavelength Heating Method.

Although specific advantages have been enumerated above, various embodiments may include some, none, or all of the enumerated advantages. Additionally, other technical advantages may become readily apparent to one of ordinary skill in the art after review of the following figures and description.

BRIEF DESCRIPTION OF THE DRAWINGS

For a more complete understanding of this disclosure and its features, reference is now made to the following description, taken in conjunction with the accompanying drawings, in which:

FIGS. 6D-6H illustrate various points of view of a spring system of the blackbody core according to embodiments of the present disclosure;

DETAILED DESCRIPTION

It should be understood at the outset that, although example embodiments are illustrated below, the present invention may be implemented using any number of techniques, whether currently known or not. The present invention should in no way be limited to the example implementations, drawings, and techniques illustrated below. Additionally, the drawings are not necessarily drawn to scale.

The systems and methods of the present disclosure are configured for use in a variety of environments and for a variety of applications. For example, a blackbody can be used inside cryogenic vacuum environment for characterizing Ballistic Missile IR seekers. The blackbody also can be used inside a non-cryogenic vacuum environment or inside an ambient environment that is not cryogenically cooled, but instead cooled by another cooling method.

The Molecular Resonant Wavelength-Radio Frequency Heating method could cause specific materials to super heat, such as to heat up enough to cause an electron population inversion of the material. Population inversion of a material provides one of the factors necessary for lasing. As another example, the method for testing the IR emissivity of a material can be used to determine the resonant frequency for a tungsten filaments. The Molecular Resonant Wavelength-Radio Frequency Heating method can be applied to the tungsten filament to cause the filament to glow by using approximately one-tenth the amount of energy that is used to heat the filament by sending electric current through the filament.

Figure 1:
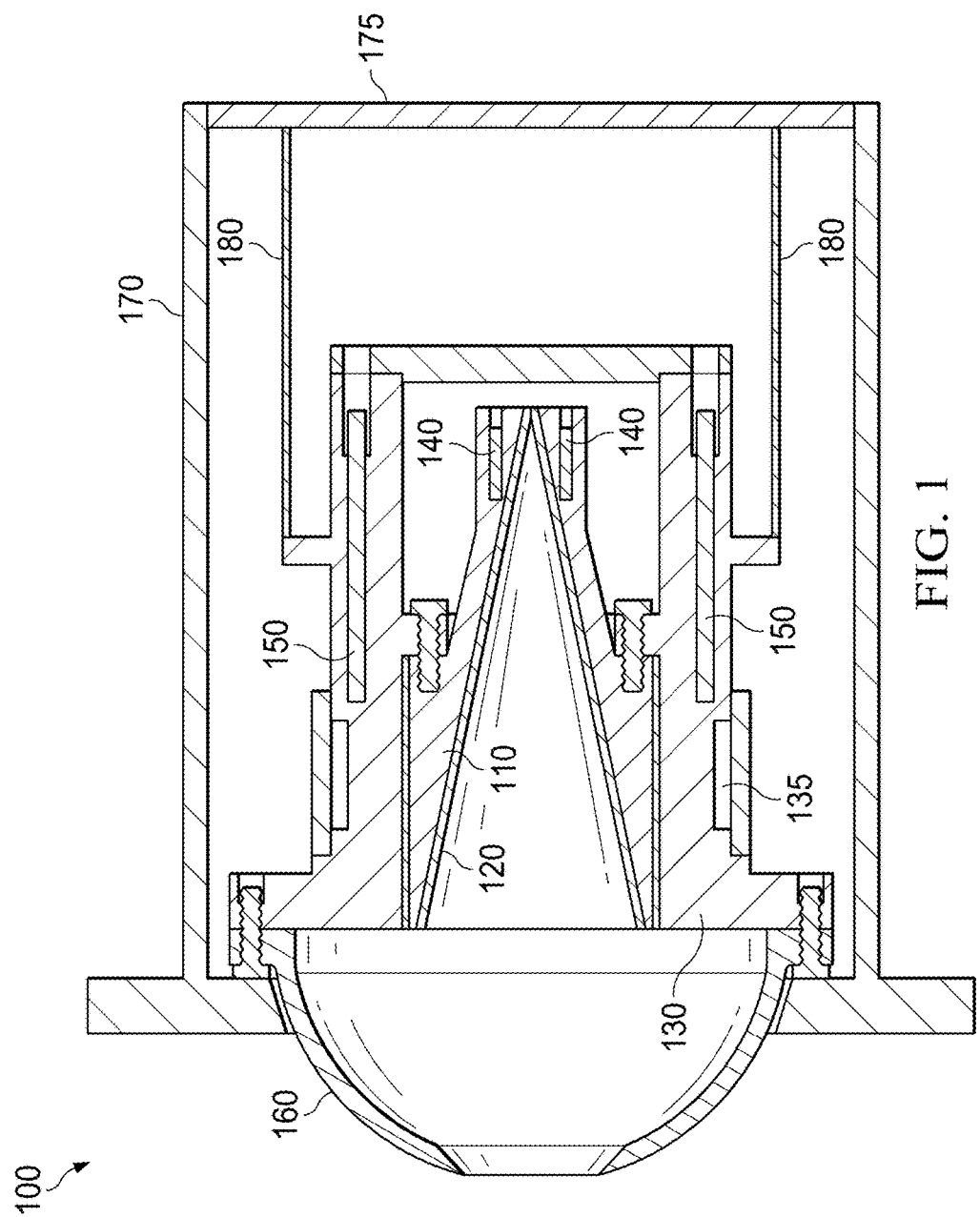
FIG. 1 illustrates an a cross sectional view of a blackbody.

FIG. 1 illustrates a cross sectional view of a blackbody 100. The blackbody 100 includes a blackbody core 110 (also referenced as "core" or as an "Emitting Cone"), a liner 120, an aft shield 130 that includes an interior cooling channel 135, multiple temperature sensors 140, multiple heater rods 150 (also referenced as Embedded Heating Elements), a hood 160 (also referenced as a Foreshield), and a cryo-shield 170 that includes a mounting base 175. The blackbody 100 generates heat from the heater rods 150 and emits infrared light through the Emitting Cone 110. The infrared light emissions from the cone 110 exit the blackbody through an opening in the foreshield 160. The blackbody 100 is adapted to characterize an infrared seeker for space-based operations. Although certain details will be provided with reference to the components of the blackbody 100, it should be understood that other embodiments may include more, less, or different components.

Theoretically, a blackbody has an emissivity of one ($\varepsilon=1$). However, since no real object has an emissivity of one (1); any real object has an emissivity less than one ($\varepsilon=1$), such as 0.99 or 0.999. In practical applications, there are two types of emissivity, real emissivity and apparent emissivity.

Real emissivity (also known as actual emissivity) is the emissivity of a flat surface of a material. Apparent emissivity is the emissivity measured by an infrared sensor. In certain circumstances, the real emissivity of an object is different from the apparent emissivity of the object because an infrared sensor, which measures apparent emissivity, cannot differentiate changes in emissivity of flat-surfaced objects and protruding or concave objects. For example, the stainless steel liner 120 has a real emissivity of 0.92. Additionally, the shape of an object affects the apparent emissivity of the object. An interior cone shape increases the apparent emissivity. For example, from a front point of view (looking into the foreshield), the cone shape of the liner 120 increases the apparent emissivity of the cone-shaped liner to a value greater than 0.92.

The aft shield 130 is mounted to the mounting base 175 by thermal insulator-controlled infrared leaks 180. The core 110 is mounted within the aft shield 130, which provides structural support and conducts heat to the core 110. The heating rods 150 produce heat to change the temperature of the blackbody 100. The temperature sensors 140 measure the temperature of the blackbody 100 from within the blackbody core 110. The liner 120 conducts heat from the core 110 and provides a high emissivity (e.g., at least 0.92 emissivity ($\varepsilon \geq 0.92$)) for the core 110.

The heating rods 150 are embedded in the aft shield 130. The heating rods 150 are bonded in place using a conductive bonding material. In space and in a vacuum, convection and evaporation cannot take place because no air is present. Accordingly, the heating rods 150 heat up the aft shield 130, which heats other components within the blackbody 100 by conduction. That is, the heat of the heating rods 150 is conducted to a large thermal mass; the large thermal mass includes the aft shield 130, the blackbody core 110, the liner 120, and the foreshield 160. An isothermal condition exists when the components of the blackbody 100 have the same temperature. The blackbody core 110 takes approximately one hour to change temperature and stabilize because of the long thermal path from the heat source (i.e. heating rods 150) throughout the large thermal mass.

The temperature sensors 140 are embedded in the blackbody core 110 and bonded within the core 110 using a conductive bonding material. That is, the conductive bonding material is an intermediary between the core 110 and the temperature sensor 140. The bonding material conducts the heat of the core 110 to the temperature sensors 140, enabling the temperature sensors 140 to sense the temperature of the core 110. The accuracy of the measurements of the temperature of the core 110 depends on the thermal conductivity limits of the conductive bonding material. The temperature sensed by the temperature sensors 140 also depends on the thermal conductivity of the temperature sensor.

Similarly, a conductive bonding material bonds the heating rods 150 to the aft shield 130. As such, the conductive bonding material is an intermediary between the aft shield 130 and the heating rod 150. The conductive bonding material conducts the heat of the heating rods 150 to the aft shield 130, enabling the aft shield to conduct heat to the remainder of the large thermal mass until the large thermal mass reaches an isothermal condition. The ability of the heating rods 150 to heat the core 110 depends on the thermal conductivities of the heating rods 150 and of the conductive bonding material.

Every component (such as the aft shield 130, temperature sensors 140, heater rods 150, and liner 120) in contact with the blackbody core 110 can cause the blackbody 100 to fail in operation. For example, the temperature sensors 140, heater rods 150, and liner 120 are each a single point of failure of the blackbody 100. Under certain operating conditions, the blackbody core 100 gets hot enough to evaporate the stainless steel liner 120 (for example, 1000 Kelvin). Under certain operating conditions, the temperature sensors 140 cannot accurately measure the temperature of the blackbody core 100 because the thermal conductivity property of the conductive bonding material changes or because the thermal conductivity property of the temperature sensor. Under certain operating conditions, the heating rods 140 cannot transfer as much heat to the blackbody core 100. When a temperature sensor 140 or heating rod 150 fails, the sensor or rod, together with the associated bonding material, must be removed and replaced. Removing and replacing a temperature sensor 140 or heating rod 150 is not a trivial task. For example, removing and replacing a temperature sensor 140 or heating rod 150 can involve drilling out the old failed part and bonding in new parts.

Molecular Resonant Wavelength-Radio Frequency Heating

Figure 2:
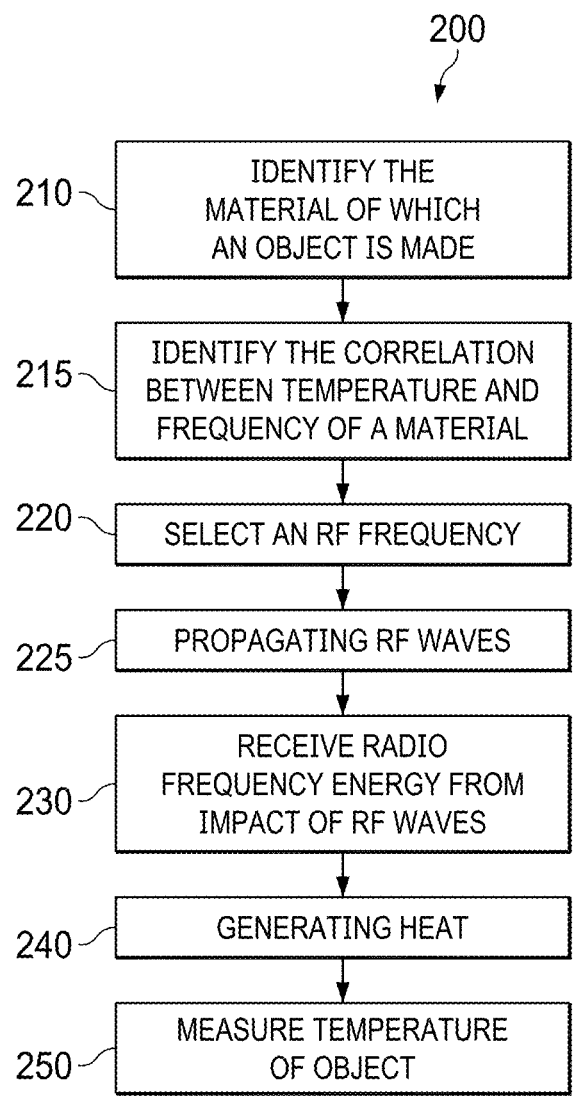
FIG. 2 illustrates an a Molecular Resonant Radio Frequency Wavelength-Resonant Radio Frequency Heating process according to embodiments of the present disclosure.

FIG. 2 illustrates a Molecular Resonant Wavelength-Radio Frequency Heating method 200 according to the present disclosure. The method 200 is also referred to as a "Pendulumatic Wavelength Heating Method." The method 200 is a non-contact heating method implemented by a system according to embodiments of the present disclosure. According to the method 200, when radio frequency waves are incident upon an object, the RF waves cause movement of the molecules of the material from which the object is composed. The moving molecules create friction, which generates heat in the material and emit infrared energy from the object. When the frequency and wavelength of the RF waves include a resonant frequency, the object produces heat at a rate faster than at any other frequency. The system monitors and controls the IR energy output using non-contact methods. The embodiment of the process 200 shown in FIG. 2 is for illustration only. Other embodiments could be used without departing from the scope of this disclosure.

The material of an object is identified in block 210. In certain embodiments, the identification is based on inputs from a user into a computer of the system, indicating the material of the object, received by the system. For example, if the object is a blackbody core, then the material can include stainless steel or aluminium, a composition of ceramics, or other suitable material.

In certain embodiments, in response to identifying the material from which the object is composed, the system determines a correlation between the temperature and frequency of the material in block 215. The relationship between temperature and frequency as related to heat generation within the object is described in further detail in reference to FIG. 3, below. For example, in response to a user selection identifying the ceramic material of the object, the system determines the Temperature as a function of Frequency relationship for the ceramic material (shown in FIG. 3). When a correlation between temperature, frequency, IR photography color, and material has not been predetermined, block 215 includes performing the method 1000 (shown in FIG. 10) to generate the correlation.

In block 220, a wavelength of radio frequency waves is selected. Together, the wavelength and the frequency of RF waves that are incident upon the object correspond to a temperature of the material identified in block 210. In certain embodiments, in response to the identification of the material in block 210, the system selects a wavelength based on the molecular moments of the core material of the system. In certain embodiments, a user's input to the computer of the system selects the wavelength. For example, a user's input can select the RF wavelength by specifying a waveform measurement, such as a frequency in the GHz range. When the system is set to a mode to generate RF waves at the resonant frequency of the material of the object, then in response to the identification of the material in block 210, the system determines the wavelength corresponding to the resonant frequency of the identified material. For example, in response to receiving user input in block 210, the input identifying the material of the object, the system (set to a mode to generate RF waves at the resonant frequency of the material) selects the wavelength that corresponds to the resonant frequency of the identified material using the correlation determined in block 215.

For an electromagnetic wave (such as a radio frequency wave) travelling through a vacuum (space), the relationship between the frequency and wavelength of the wave can be expressed by Equation 1.

$$f = \frac{c}{\lambda} \quad (1)$$

In Equation 1, f represents frequency, c represents the speed of light in a vacuum, and $\lambda$ represents wavelength. Once the wavelength of the RF waves is selected, the system can determine the temperature to which the identified material will generate heat and isothermally stabilize based on that wavelength.

In certain embodiments of block 220, a frequency of RF waves is selected. In response to the identification of the material in block 210, the system can select a frequency based on a mode of the system. Optionally, a user's input selects the frequency by specifying a frequency measurement, such as a number of Hertz. When the system is set to a mode to generate RF waves at the resonant frequency of the material of the object, then in response to the identification of the material in block 210, the system determines the resonant frequency of the identified material. For example, in response to receiving user input in block 210, identifying the material of the object, the system (set to a mode to generate RF waves at the resonant frequency of the material) selects the resonant frequency of the identified material. Once the frequency of the RF waves is selected, the system can determine the temperature to which the identified material will generate heat and isothermally stabilize based on that frequency.

In certain embodiments, a desired temperature of the object is selected in block 220. In certain embodiments, a user's input selects the temperature by specifying a temperature measurement, such as an amount of Kelvin or a degree of Fahrenheit. When the system is set to a mode to generate RF waves at the resonant frequency of the material of the object, then in response to the identification of the material in block 210, the system determines the maximum temperature generated within the identified material according to the Molecular Resonant Wavelength Heating Method 200. When the selected desired temperature is the maximum temperature, the system selects the resonant frequency and corresponding wavelength that correspond to the identified material. When the selected desired temperature is not the maximum temperature, the system selects the frequency and corresponding amplitude that correspond to the identified material isothermally stabilizing at that desired temperature. The system can control the temperature by selecting the molecular resonant wavelength and varying the amplitude (power) of the RF amplifier. An increase in amplitude increases power and generates more heat.

Radio frequency waves travel toward the object in block 225. The RF waves travel at the frequency and the wavelength selected in block 220. In certain embodiments, the RF waves enter a waveguide and propagate within a hollow propagation channel of the waveguide.

The object receives RF energy from radio frequency waves of the selected wavelength in block 230. The wavelength of the RF waves is the wavelength selected in block 220. The object can be a black body core or other type of real object. The object can be disposed within the hollow propagation channel of the waveguide, such as disposed in a fixed location.

In block 240, in response to the impact of RF waves on the object, the object generates heat to a temperature, such as a desired temperature. In certain embodiments, user inputs received in block 220 indicate a desired temperature of the object. According to embodiments of the present disclosure, the temperature of the object corresponds to a frequency of the RF waves received in block 230. That is, the frequency and associated wavelength selected in block 220 cause the object to generate heat to the desired temperature of the object. The object converts RF energy into infrared energy in block 240. The hot body of the object emits IR waves. In certain embodiments of block 240, the object is a blackbody core. A spring system clasps and mounts the emitting core in a fixed location within the hollow propagation channel of the waveguide, and the spring system prevents a transfer of heat from the emitting core to the waveguide by conduction. In certain embodiments, the waveguide is coupled to a hood that includes an aperture. Infrared waves emitted from the blackbody core exit the hood through the aperture. The hood prevents RF waves from exiting the waveguide by reflecting the RF wave back onto the blackbody core. The exit aperture of the hood is small enough as to not allow propagation of the RF energy past the aperture.

A temperature of the object is measured using a non-contact thermometer in block 250. An infrared sensor of an IR seeker is an example of a non-contact thermometer. An IR camera looking at the heated object generates an IR photograph of the objects. The IR photograph displays one or multiple colors, each color corresponding to the temperatures of heat emitted from the object. An IR seeker receives the IR photograph and determines the temperatures emitted from the object using the color-temperature calibration of the IR seeker.

It is important to note that while the present disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the process 200. Examples of machine usable, machine readable or computer usable, computer readable mediums include: non-volatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Temperature as a Function of Frequency

According to embodiments of the present disclosure, an object composed of a single homogeneous ceramic material and placed within a radio frequency waveguide converts RF energy into infrared energy. The heating method 200 uses RF energy to create IR energy. By way of comparison, the molecular resonant wavelength radio frequency heating method 200 generates heat quicker than the conduction heating within the blackbody core 100, which takes approximately one hour to change temperatures and thermally stabilize (such as to become isothermal).

Embodiments of the disclosure provide systems and methods using resonant RF energy. When impacted by a RF wave at certain wavelengths, the material will heat up very easily and efficiently. At other wavelengths, the material will not generate heat as effectively. Embodiments of the present disclosure provide specific resonant frequencies for different materials.

The molecular resonant wavelength resonant radio frequency heating method 200 is based on two principles. The first principle is that core length is equal to the radio frequency wavelength (second order). The second principle is Molecular Friction, wherein a particle molecular moment equals radio frequency time.

The principle of Molecular Resonant Friction is represented by Equation 2 below:

$$T \approx 2\pi \sqrt{\frac{L \times m}{F}} \qquad (2)$$

The molecules in any material have a specific length between the molecules; the molecules have a specific mass; and a force holds the molecules together. According to embodiments of the present disclosure, if the molecules are impacted by a radio frequency wave of a resonant frequency, the molecules will be subject to molecular friction to move against each other resonantly in a pendulumatic fashion. The time constituent of the resonant frequency can be determined using Equation 2. In Equation 2, T represents time, which is the period of oscillation of a pendulum; L represents length of the pendulum; F represents force acting on the pendulum (such as gravity); and m represents mass of the pendulum. Equation 2 relates to each molecule within the material from which an object is composed. The molecules, each, have a molecular mass, m. The molecules within the material are disposed a distance apart from each other, L. The force, F, is the bond force that holds the molecules together. T represents the period of oscillation of each molecule moving against each other molecule within the material.

Each molecule has a molecular moment of inertia. Equation 3 represents the Molecular Moment of Inertia for the material $$I = L \times m \qquad (3)$$

In Equation 3, L represents the distance between molecules, the length of the pendulum. The mass of the molecule, me, is the mass of the pendulum. The moment of inertia is represented by I.

In Equation 4, the period of the pendulum motion of a molecule that overcomes molecular friction equals the period (i.e., T=1/f) of the RF waves that impact each molecules at the resonant frequency of the material. That is, the when RF waves have a resonant frequency of the material, then those RF waves cause the molecules in the material to move most efficiently, generating heat most efficiently.

$$T = \frac{1}{f} = 2\pi\sqrt{\frac{L \times m}{F}} \qquad (4)$$

Figure 3:
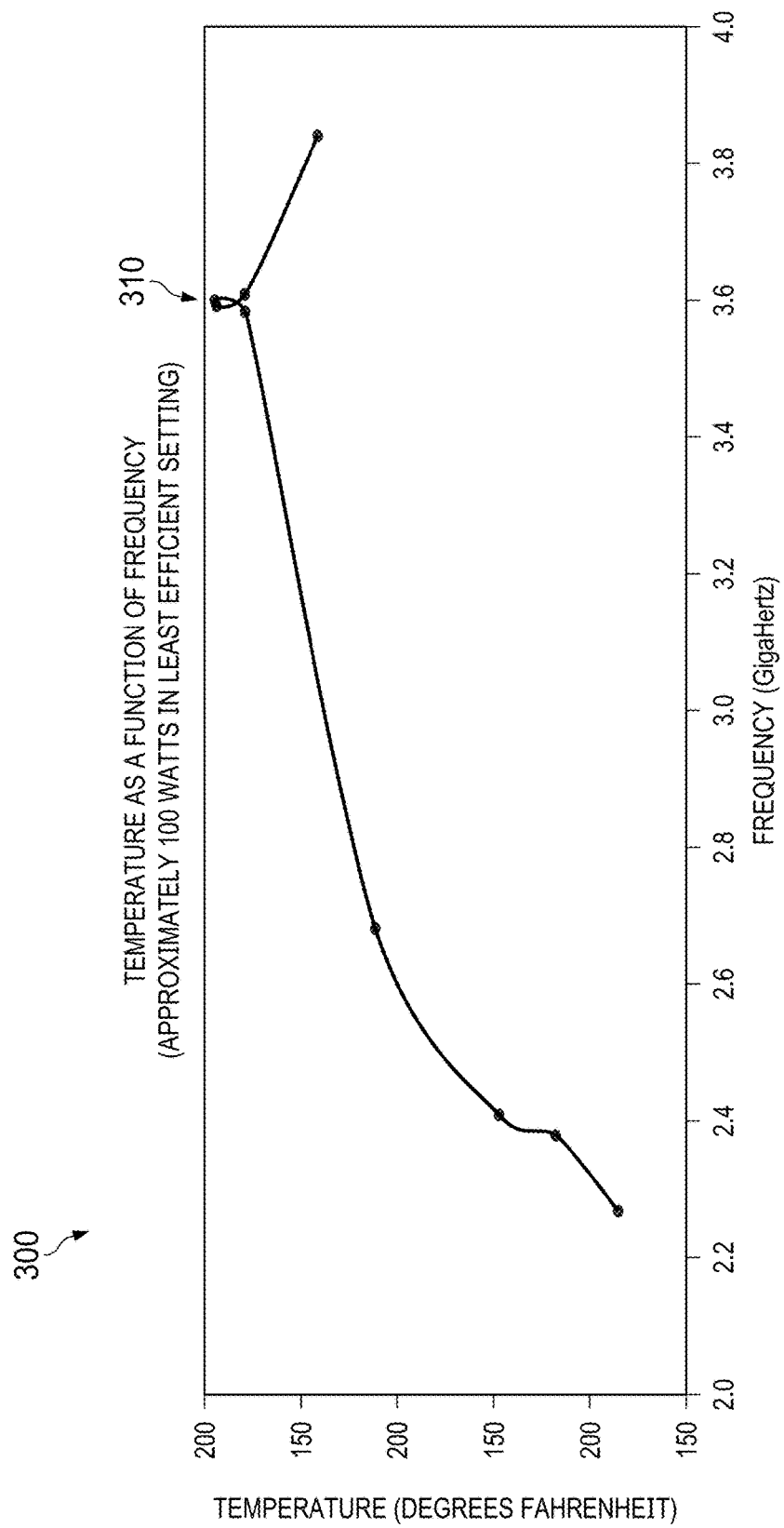
FIG. 3 illustrates a relationship between temperature and frequency as related to heat generation within a material according to embodiments of the present disclosure.

FIG. 3 illustrates a graph 300 of Temperature as a function of Frequency of a material included in a blackbody core. The graph 300 illustrates the relationship between the temperature of heat generated by the material when impacted by RF waves of a specific frequency. Frequency is measured in gigahertz on the x-axis. Temperature is measured in degrees Fahrenheit on the y-axis. The point 310 illustrates a maximum temperature generated by the material at the resonant frequency of that material. The point 310 also illustrates that the slope of the graph is substantially vertical, representing the rate of increase of temperature of the material at the resonant frequency. The points on the graph 300 are stored in a memory of the system, storing the correlation between the frequency and corresponding temperature for that specific material. For various other materials, an analogous graph and set of correlations for eave specific material are stored in the memory of the system.

Non-Contact Blackbody System

Figure 4:
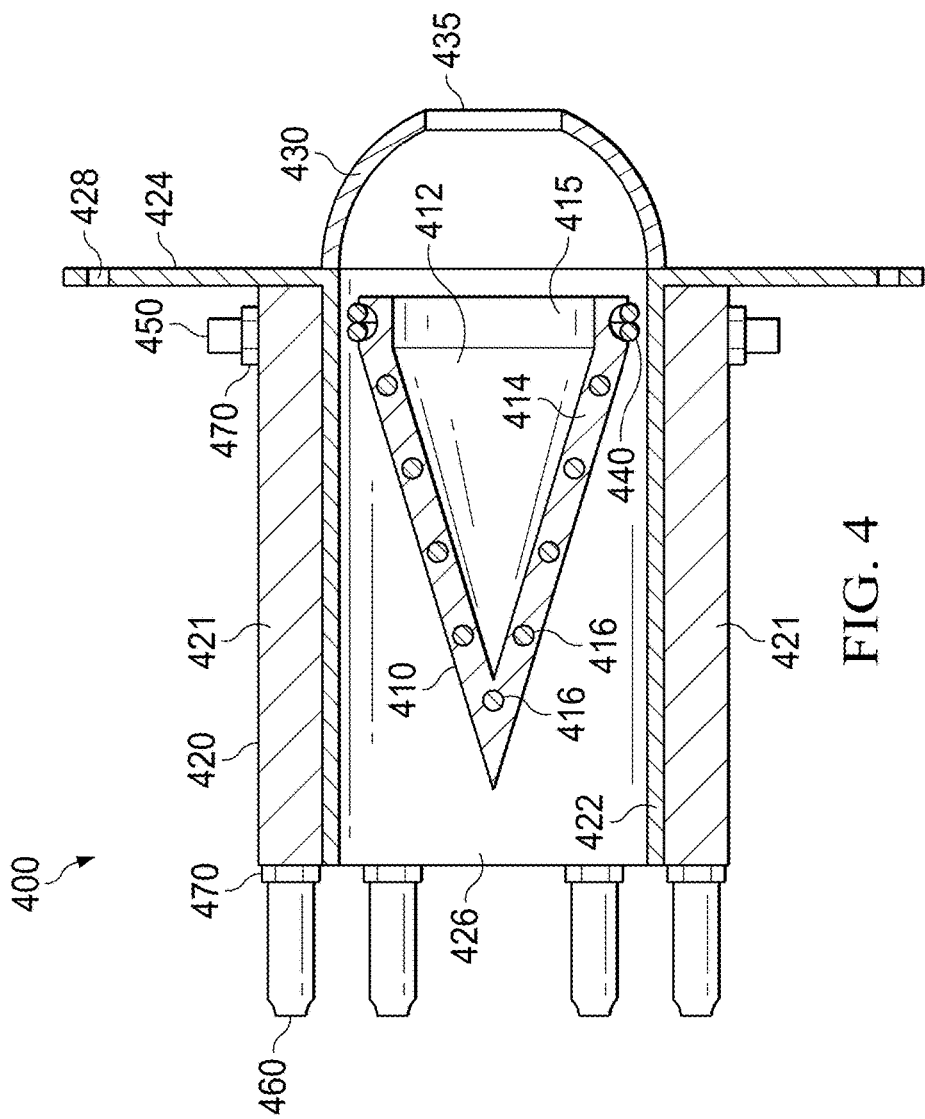
FIG. 4 illustrates a blackbody according to embodiments of the present disclosure.

FIG. 4 illustrates a blackbody 400 in accordance with embodiments of the present disclosure. The blackbody 100 is adapted to calibrate an infrared seeker for space-based operations. Radio frequency waves that enter the blackbody 400 cause the blackbody to generate heat and to emit infrared light. The infrared light emissions are concentrated to exit through an opening of the blackbody 400. Certain functional characteristics of the blackbody 400 are discussed below in reference to FIG. 5.

Although certain details will be provided with reference to the components of the blackbody 400 it should be understood that other embodiments may include more, less, or different components. The blackbody 400 includes a blackbody core 410 (also referenced herein as "core" and as "emitting cone"), a waveguide 420, a hood 430, multiple cooling tubes 440, multiple cryo-hose adapters 450, multiple cryogenic lines 460, and multiple fittings 470 configured to secure cryogenic lines 460 and cryo-hose adapters 450 to the waveguide 420 (the material of fittings 470 is the same as the material of the waveguide 420).

The blackbody 400 is a non-contact system that has fewer components than the blackbody 100. The blackbody 400 does not have temperature sensors 140, does not have heater rods 150, and does not have a core liner 120. Blackbody 400 has few components in physical contact with the blackbody core 410. In the blackbody 400, the core 410 is not in physical contact with the waveguide 420, and is not in physical contact with a liner 120. A non-contact phosphor thermometry method is used to sense the temperature within the blackbody 400.

The blackbody core 410 is formed from a ceramic material that has a high thermal diffusivity, low vapor deposition, radio frequency absorptivity and high emissivity. In certain embodiments, the blackbody core 410 includes a single homogeneous ceramic material. Silicon carbide is an example of a single homogeneous ceramic material. In certain embodiments, the blackbody core 410 includes a layered ceramic material. For example, a first layer of the blackbody core 410 includes the exterior surface of the core 410 and a first ceramic material designed for RF absorption (also called "absorptive layer"). A second layer of the blackbody core includes the interior surface of the core 410 and a second ceramic material designed for IR emittance (also called "emittive layer"). The two different ceramic materials are sintered together during a firing process to form a single homogeneous unit.

The blackbody core 410 is dimensioned to be in the shape of a hollow cone. The interior of the cone is a concentric conic hollow space 412, which is a distance from the outer surface of the cone; the distance being the thickness 414 of the ceramic material. A cone exhibits good properties for both RF absorption and IR emittance. In certain embodiments, the cone-shaped blackbody core 410 is a round cone with a round base 415, such as a circular cone with a circle base. In certain embodiments, the inner diameter of the base 415 of the cone-shaped core 410 is one and one-half inches (1.5"), which is the same as the inner diameter of the base of the core 110. The core 410 of blackbody 400 is slightly longer than the core 110 of blackbody 100. The blackbody core 410 is disposed within the interior 426 of the waveguide 420. Further details of the blackbody core 410 are described below in reference to FIGS. 6A, 6B, and 6C.

In certain embodiments, the thickness 414 of the emitting cone 410 includes an interior frame 416 or mesh made from a high thermally conductive metal adapted to evenly heat the blackbody core 410 and to reduce or to prevent thermal gradients within the cone. The frame 416 increases the thermal diffusivity of the blackbody core 410 by distributing heat throughout the core. The frame 416 creates and maintains the isothermal condition of the blackbody core 410 by transferring heat from a hot portion of the core to a less hot portion of the core. The thickness 414 of the blackbody core 410 surrounds the frame 416. The frame 416 distributes heat throughout the thickness and length of the core 410. The frame 416 comprises a material having a higher thermal conductivity than the ceramic material of the core 410. The frame 416 comprises a metal material, such as tungsten wire. In certain embodiments, the shape of the frame 416 includes a plurality of concentric circles or polygons of increasing diameter disposed beneath each other. Other shapes of the frame 416 include a grid, a spiral, a mesh such as a screen, and a starburst.

The waveguide 420 is a unified body that includes a heat exchanger 421, a hollow tube 422 as a wave propagation channel, and a round brim flange 424. The hollow tube 422 can be configured in any of a variety of shapes, including rectangular or round. The hollow tube 422 (hereinafter "hollow cylinder") within the waveguide is centered within the heat exchanger 421. The interior 426 of waveguide's hollow cylinder 422 comprises a highly reflective material, such as polished aluminum, or polished stainless steel with an emissivity of one-tenth ($\varepsilon=0.1$) or less. The hollow cylinder 422 of the waveguide 420 is designed to propagate RF waves of specific wavelengths. In certain embodiments, the interior 426 of the cylindrical waveguide is coated with gold in order to have an emissivity of two-hundredths ($\varepsilon=0.02$). The brim flange 424 of the waveguide includes a plurality of fitting holes 428. The waveguide 420 provides structural support to the cone-shaped blackbody core 410 housed within the waveguide 420.

The hood 430 of the blackbody 400 prevents RF waves from exiting the waveguide by reflecting the RF wave back onto the interior surface of the blackbody core 410. The hood 430 includes a material of a high RF reflectivity, such as aluminum. In certain embodiments, the hood 430 is configured into a parabolic shape. In certain embodiments, the hood 430 is a conical shape (as shown in FIG. 5).

The hood 430 includes an exit aperture 435, which is an opening in the hood. The exit aperture 435 is a void within a portion of the hood 430. The exit aperture 435 is surrounded by edges of a portion of the hood that form the void. The edges of the portion of the hood can be configured in a circular configuration such that the exit aperture 435 comprises a circular shape. In certain embodiments, the exit aperture 435 in the hood has a one-inch diameter. The center of the exit aperture 435 can be collinear with one or more of: the apex, the center axis of the cone-shaped core 410, and the base 415 of the cone-shaped core.

For calibrating an infrared seeker, the background of the scene presented to the infrared seeker should be cooler, relative to the temperature of the hot blackbody core 410. To keep the outside of the waveguide 420 cool, a waveguide 420 includes channels within the heat exchanger 421. Each channel includes a cryogenic line 460 for flowing cryogenic fluid through the heat exchanger 421 of the waveguide that surrounds the hollow cylinder 422. The cryogenic lines 460 conduct a cryogenic cooling fluid, such as liquid nitrogen. That is, the cryogenic lines 460 are configured to transport or otherwise enable a flow of the cryogenic fluid. The cryogenic lines 460 comprise a material that has a high thermal conductivity. For example, the cryogenic lines 460 can be comprised of channels drilled through an aluminum block (such as the heat exchanger 421) to allow the cryogenic cooling fluid to flow and remain contained.

Figure 5:
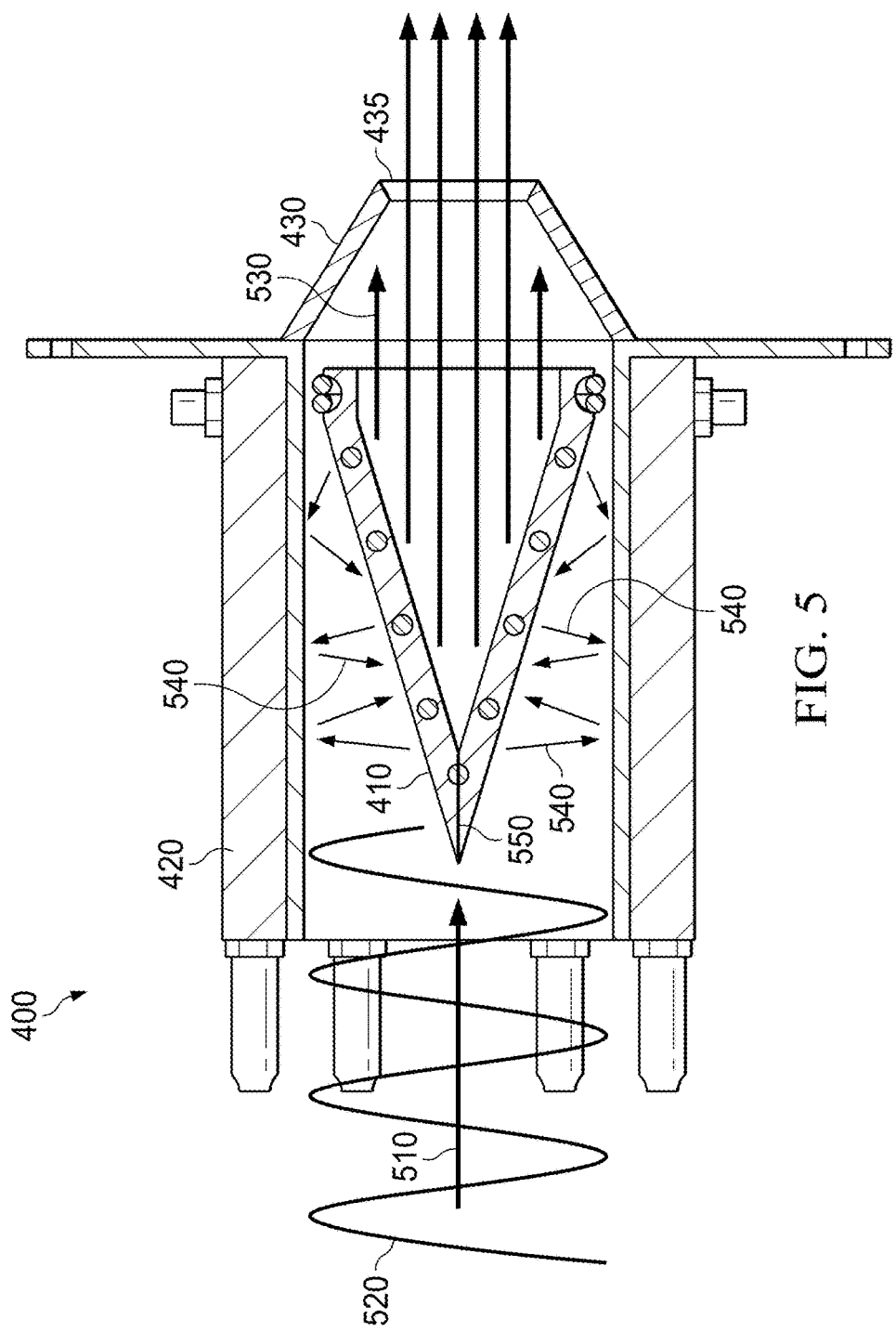
FIG. 5 illustrates operational and functional characteristics of the blackbody according to embodiments of the present disclosure.

FIG. 5 illustrates operational and functional characteristics of the blackbody 400 according to embodiments of the present disclosure. Arrow 510 indicates a forward direction that the radio frequency waves propagate and RF energy (together "RF energy") travels, from a first portion (e.g., back) of the waveguide 420 (illustrated on the left) toward a second portion (e.g., front) of the waveguide (illustrated on the right). The RF energy enters the first portion of the waveguide in the form of RF waves 520. When the RF waves 520 strike the surface of the blackbody core 410 (the waves are "incident upon" the core), the molecules of the blackbody core 410 excite and move. The excitation and movement of the molecules cause the blackbody core 410 to produce heat. The high thermal diffusivity characteristic of the blackbody core material causes the inner surface and outer surface of the of the blackbody core 410 to be the same temperature, i.e., isothermal.

The blackbody core 410 emits infrared energy when heated. The inner curved surface of the cone-shaped core 410 emits infrared energy 530 forward, in the direction of the arrows 530. The infrared energy 530 travels from the inner surface of the core 410 (from as far back as the apex of the cone-shaped core at the rear of the interior of the core) toward and through the base 415 of the cone-shaped core at front of the core. In addition to the IR waves emitted forward out of the inner surface of the core 410, the outer curved surface of the cone shaped core 410 emits infrared energy 540 into the waveguide 420. The infrared waves travel from the outer surface of the core 410 and strike the inner surface of the waveguide 420. The polished aluminum inner surface of the waveguide 420 is highly reflective and reflects the IR energy 540 back onto the outer surface of the cone-shaped core 410. The reflected IR waves 540 that are incident upon the outer surface of the core 410 is a form of recycled heat that keeps the core 410 isothermal, increasing the efficiency of the blackbody 400 system. The high emissivity of the blackbody core 410 material causes the core to quickly absorb the recycled heat of the reflected IR waves 540. The polished aluminum exhibits good waveguide RF propagation characteristics. The temperature within the core material is isothermal.

The blackbody 400 contains the RF energy within the waveguide 420. The RF energy cannot propagate forward through the cone 410. An aperture 550 within the rear of core 410 is adapted to filter RF energy 520 from propagating out of the waveguide. When an RF wave is incident upon the aperture, the RF wave dissipates. The aperture 550 is an opening in the waveguide 420 that has a diameter that is smaller than the RF wavelength. The length of the opening of the aperture 550 is from the apex of the inner surface of the cone-shaped core 410 to the apex of the outer surface of the core 410. Infrared energy 540 can travel through the aperture 550, but the diameter of the aperture prevents RF energy from entering into or propagating through the aperture 550. In certain embodiments, the exit aperture 435 in the hood 430 has a one-inch diameter. The slope and length of the conical-shaped hood 430 is derived from the diameter of the interior 426 of the waveguide and the diameter of the exit aperture 435.

The steepness of the slant of the interior surface of the cone-shaped core 410 creates enhancement to contain RF energy within the waveguide and prevent the RF waves from propagating forward and escaping the blackbody 400.

Cavity enhancement is a property of a cavity in which when an electromagnetic wave of light is injected into the cavity. The wave of light reflects within a cavity and does not have an opportunity to exit forward 510 out of the cavity. The opening angle of the interior of the emitting cone 410 affects cavity enhancement. The steepness of the slant of the interior surface of the cone is a function of a minimum number of times the wave of IR light must reflect until the wave reflects to travel forward 510. As the IR emissivity of the blackbody core increases, the IR reflectivity decreases and the opening angle 430 of the cone-shaped core 410 decreases. The reflectivity of the liner 120 of the blackbody 100 is approximately 10% at certain wavelengths of interest, and the opening angle 630 of the hollow cone 110 is approximately 25°.

The circular shape of the propagation channel of the waveguide 422 allows a narrow band of frequencies of RF waves to propagate within the interior 426 of the waveguide. In comparison, wider bands of frequencies of RF energy waves propagate within a rectangular waveguide. As the diameter of a circular waveguide supports a limited bandwidth of frequencies, the frequency necessary to stimulate the molecules within the blackbody core 410 must be identified so the RF energy can propagate within the circular shaped waveguide. The wide bandwidth that a rectangular waveguide provides is superfluous. The range of frequencies that stimulate the molecules is material dependent.

Figure 6B:
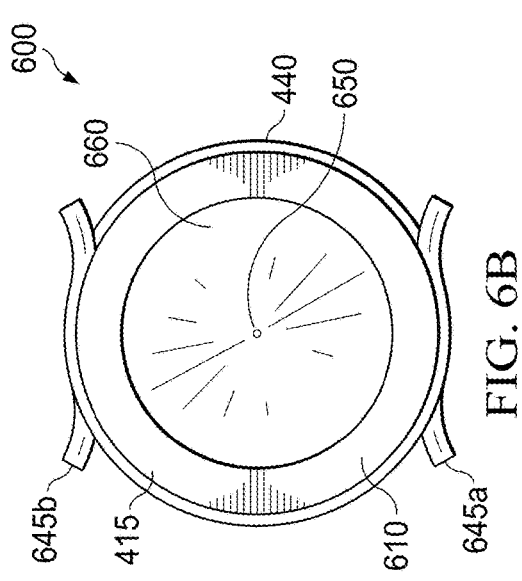
FIGS. 6A, 6B, and 6C illustrate various exterior views of the blackbody core according to embodiments of the present disclosure.
Figure 6C:
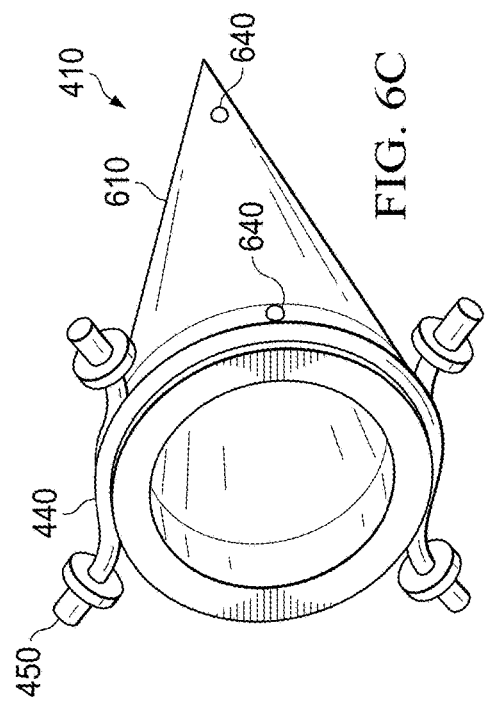
Figure 6A:
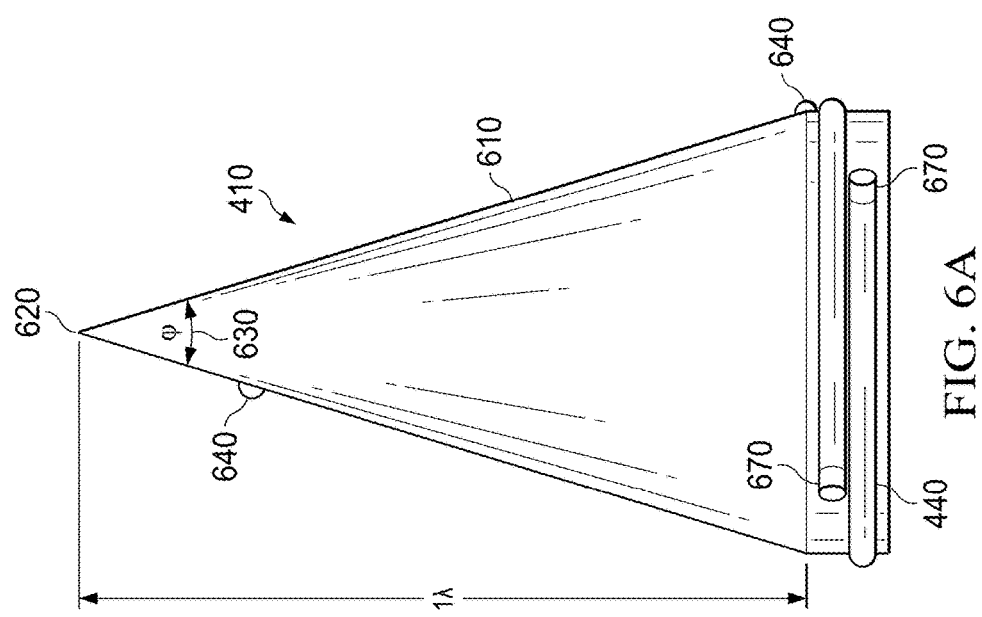

FIGS. 6A, 6B, and 6C illustrate various exterior views of the blackbody core according to embodiments of the present disclosure. FIG. 6A shows a side view of the core 410 with the rear of the core at the top of the drawing and the front of the core 410 at the bottom of the drawing. FIG. 6B shows a spring system that physically supports the core 410 within the waveguide 420. FIG. 6B shows a view of the front of the core 410, a view looking into the exit aperture 435. FIG. 6C shows an isometric view of the core 410.

As shown in FIG. 6A, the axial length of the core 410 is approximately one wavelength RF ($1\lambda$). The axial length necessary for the cone can be correlated to the wavelength of the structural resonant frequency of the ceramic cone. The center of the base 415 can be coaxial with the apex 620 of the cone-shaped core. That is, the apex 620 of the cone-shaped core 410 and the center of the base 415 are collinear. The opening angle 630 (also called the cone angle) is the angle between the slanted sides of the outer surface 610 of a cone. In certain embodiments, the opening angle 630 ($\varphi$) of the cone is twenty-five degrees (25°). That is, the opening angle 630 of the blackbody core 110 is 25°.

The outer surface 610 of the core includes permanently bonded phosphor dots 640. The phosphor dot 640 enables the temperature of the core to be determined using a non-contact method. The phosphor dot 640 also enables the temperature of the blackbody core 210 to be controlled. When light is incident upon the phosphor dot 640, the phosphor dot 640 is stimulated and emits light for a specific period of time. The temperature of the core 410 is measured by shining a laser light onto the phosphor dots 640 disposed within darkness in the hollow cylinder 422. The light emitted decay time is recorded, which is the amount of time for the phosphor dot 640 to cease from emitting light. The light emitted decay time correlates to a temperature of the emitting core 410. The phosphor dot 640 can be a temperature measurement system as manufactured by LUMISENCE. The phosphor dot 640 can be bonded to the outer surface 610 of the core 210 using a bonding agent or glue, which may un-adhere from the core. The phosphor dots 640 are permanently bonded by sintering the phosphor dot 640 onto the ceramic material of the core 210. Sintering includes placing an amount of phosphor onto the ceramic material and applying heat to the combination of the phosphor dot 640 and the core 210 within a kiln. By sintering, the phosphor dots 640 become a homogeneous part material of the cone itself.

An end of the cooling tubes 440 connects to the cryo-hose adapter 450 by a mutual connection to a coupling tube 670. The coupling tube 670 is composed of a low coefficient of thermal conductivity material, such as stainless steel. In certain embodiments, the low coefficient of thermal conductivity material of the coupling tube 670 is brazed together with a high thermal conductive material (such as copper or tungsten) where the tubes make contact with the core. The coupling tube 670 is disposed within a hole of the waveguide 420. In certain embodiments, the cooling tubes 440 disposed within the interior 426 of the waveguide are coupled to the coupling tube 670 disposed on the exterior of the waveguide, and a portion of the coupled tubes is disposed within a via in the waveguide. The low coefficient of thermal conductivities of the stainless steel and G 10 type spacer inhibits heat of the core 410 from transferring to the waveguide (by conduction), thereby reducing the ability for heat to transfer out of the core 410; reducing the thermal mass heated by the core 410; and reducing a thermal transfer outside the radiation shield/waveguide 420. G10 is a glass-reinforced epoxy laminate composite material.

A front view of the blackbody core 410; the center of the figure is the apex 650 of the interior surface 660 of the core are shown in FIG. 6B. The blackbody core 410 includes a plurality of cooling tubes 440. The blackbody core 410 includes only two cooling tubes 440. The two cooling tubes 440 create a spring system 600 that holds and supports the core 410 within the waveguide 420. Specifically, the each cooling tube 440 wraps around a portion of the outer circumference of the base 415 of the cone-shaped core 410 to hold on to the core. In certain embodiments, each cooling tube 440 wraps around a portion that is less than the whole circumference of the base 415. In the example shown in FIG. 6B, the distance between a first end 645*a* of a cooling tube and the second end 645*b* of the cooling tube is an entire length of the tube 440. The length between the two ends 645*a* and 645*b* is less than the whole circumference of the base 415. The length of the portion of each cooling tube (that has and entire length between the two ends 645*a* and 645*b*) that is wrapped around the base 415 circles less than the entire circumference of the base 415.

The base 415 of the core 410 has a grooved channel in which the cooling tubes 440 are disposed. The grooved channel increases the surface area of contact between the cooling tubes 440 and the blackbody core 410 when compared to a base 415 with a flat surfaced (i.e., not grooved). For example, when the cooling tubes 440 are disposed atop a flat-surface base of the cone 410, the first surface area of contact is the area of the bottom of the cooling tubes against the flat surface of the base of the core. When the cooling tubes are disposed within the grooved channel of the base of the cone 410, the second surface area of contact is the area of the bottom of the cooling tubes that are physically in contact with a flat-surfaced base of the core plus the area of the sides of the cooling tubes that are in physical contact with the depth of the grooved channel within the base of the cone 410. The depth of the grooved channel causes the second surface area of contact to be greater than the first surface area of contact.

When it is necessary to cool the core 410, the cooling tubes 440 function as a heat exchanger to absorb heat from the core 410 and reduce the temperature of the core 410. Each cooling tube 440 comprises a material with a high thermal conductivity, such as tungsten or copper. Tungsten closely matches the coefficient of thermal expansion (CTE) of Silicon Carbide (SiC). That is, each cooling tube 440 can be composed from a material that has a thermal conductivity at least as high as the ceramic materials from which the core 410 is composed. Each cooling tube 440 includes a hollow channel through which a cooling fluid flows. The cooling tubes 440 are in thermal conduction with the blackbody core 410 and the cooling fluid within the cooling tubes. The blackbody core 410 transfers heat to the cooling tubes 440 by heat conduction. The cooling fluid within the cooling tubes absorbs a portion of the heat of the cooling tubes by heat conduction. Liquid nitrogen ($LN_2$) is an example of a cooling fluid that flows through the cooling tubes 440.

As shown in FIG. 6C, in certain embodiments, the blackbody 400 includes four cyro-hose adapters 450, including two adapters 450 per cooling tube 440. Each end 645 of the cooling tubes 440 is connected to a cryo-hose adapter 450. The cyro-hose adapter 450 is fitted to the exterior of the waveguide 420 and mounts the blackbody core 410 in a fixed location within the waveguide. The cryo-hose adapter 450 is a fitting formed from a material that has a low coefficient of thermal conductivity, such as an insulating material. Examples of materials that have low coefficient of thermal conductivity include grade-ten (G10) material, and stainless steel. The low coefficient of thermal conductivity of the stainless steel restricts heat from the core 410 from transferring to the waveguide (by conduction) and reduces the ability for heat to transfer out of the core 410. The amount of mass that absorbs heat from the core 410 by conduction excludes the waveguide 420. That is, the core 410 does not physically contact the waveguide 420. Therefore, the core 410 does not transfer heat to the waveguide by heat conduction.

FIGS. 6D, 6E, 6F, 6G and 6H illustrate various points of view of the spring system 601. FIG. 6D shows a view of the front of the spring system 601 clasped to the base 415 of the core 410. FIG. 6E shows an isometric view of the spring system 601 clasped to the base 415 of the core 410. FIG. 6F shows a side view of the spring system 601 clasped to the base 415 of the core 410. FIG. 6G shows a front view of half the spring system 601 (the core 410 not shown). FIG. 6H shows a front view of two spring systems 601 (the core 410 not shown).

The spring system 601 clasps, holds, and supports the core 410 within the waveguide. The spring system 601 includes the two cooling tubes 440. Each cooling tube 440 is disposed within the grooved channel of the base of the cone 410 and wraps around a portion of the outer circumference of the base 415 of the cone-shaped core to hold on to the core. Each end 645*a*-645*b* of each cooling tube 440 is brazed together with a coupling tube 670. The coupling tube 670 and cooling tubes 440 of the spring system 601 maintain the same material properties as in the spring system 600. The spring system 601 does not include cryo-hose adapters 450.

Figure 7A:
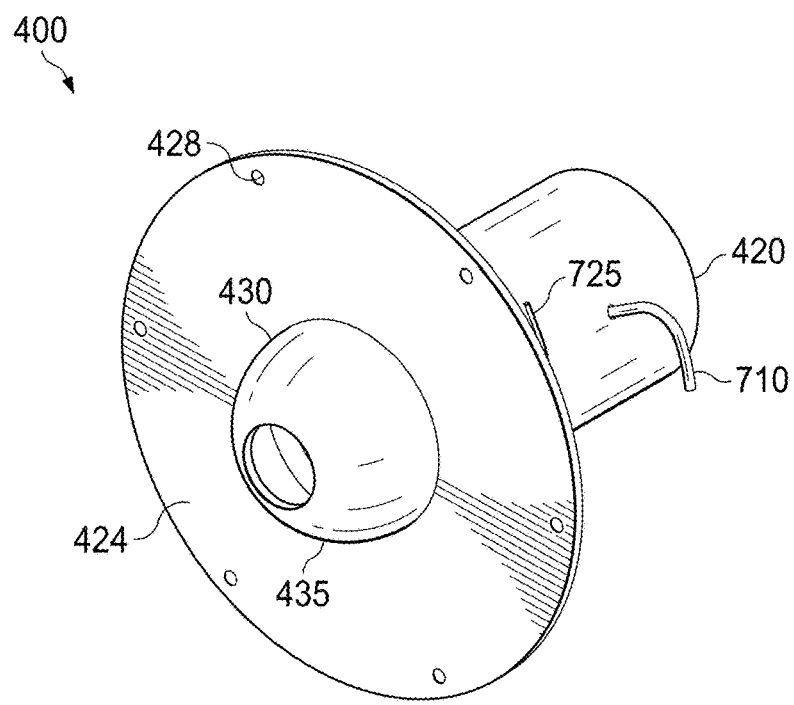
FIGS. 7A, 7B, and 7C illustrate another blackbody according to embodiments of the present disclosure.
Figure 7B:
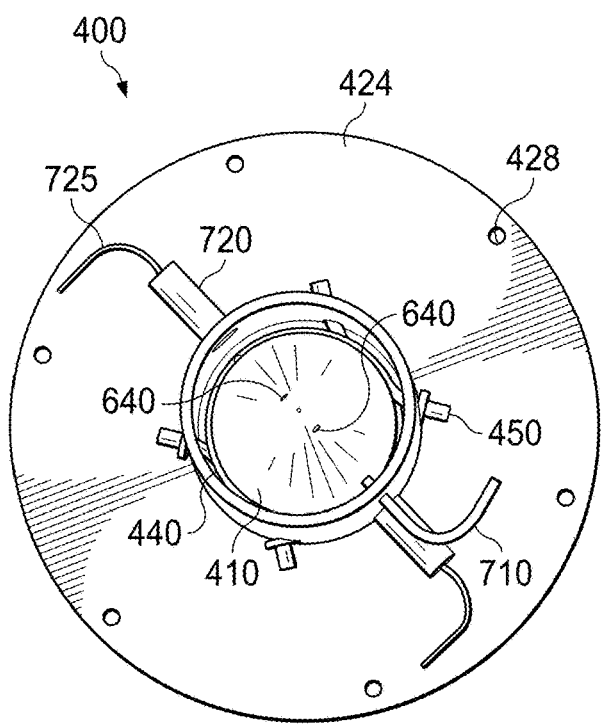
Figure 7C:
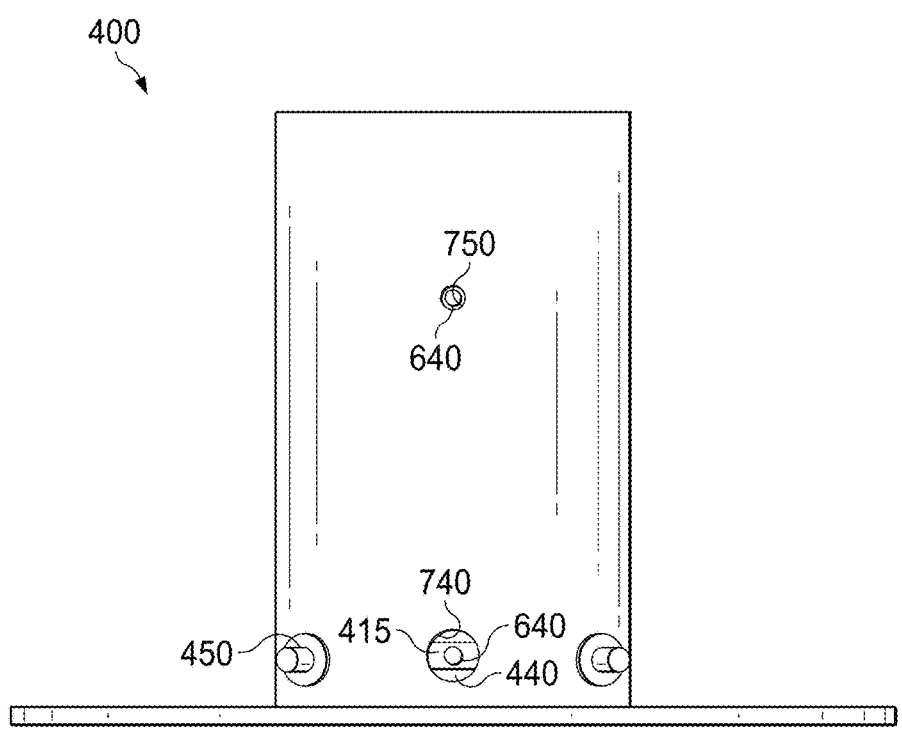

FIGS. 7A, 7B, and 7C illustrate a blackbody 400 according to embodiments of the present disclosure with the heat exchanger 421 not shown. FIG. 7A illustrates an isometric view of the front of the black body 400. The waveguide 420 includes a parabolic version of the hood 430. The hood 430 includes the exit aperture 435. The blackbody 400 includes fiber optic lines 710, 725. The fiber optic lines 710, 725 deliver the light energy to stimulate the phosphor 640. The fiber optic lines 710, 725 carry the light energy away from the phosphor 640 as the light energy decays. In certain embodiments, the time for the light energy to decay is measured by a LUMASENSE Fiber Optic Technology temperature measurement system. The optical fibers 710, 725 are small enough that their interference with the RF energy is negligible.

FIG. 7B illustrates a bottom view of the blackbody 400. The exterior apex of the blackbody core 410 is located at the center of the drawing. The blackbody 400 includes inserts 720 configured to capture the optical fibers 710, 725. The inserts 720 help maintain a flat surface within the waveguide and allow the (bare) optical fibers 710, 725 to enter the waveguide. The inserts 720 position and hold the ends of the fibers 710, 725 within close proximity (<0.1 inches) of the phosphor dots 640 of the cone 210. The insert 720 includes optical fibers 725.

FIG. 7C illustrates a side view of the blackbody 400 with the second portion (e.g., front) of the waveguide 420 depicted at the bottom of the figure. The cryo-hose adapters 450 are disposed outside and fitted to the exterior of the hollow cylinder 422 of the waveguide 420. The hole 740 is a demonstrative hole in the drawing only, and is not included in the blackbody 400. The cooling tubes 440 are can be seen through the hole 740 through the hollow cylinder 422 of the waveguide 420. The phosphor dot 640 bonded to the exterior surface of the blackbody core 410 is visible through a small hole 750 in the through the hollow cylinder 422 of the waveguide 420.

Figure 8A:
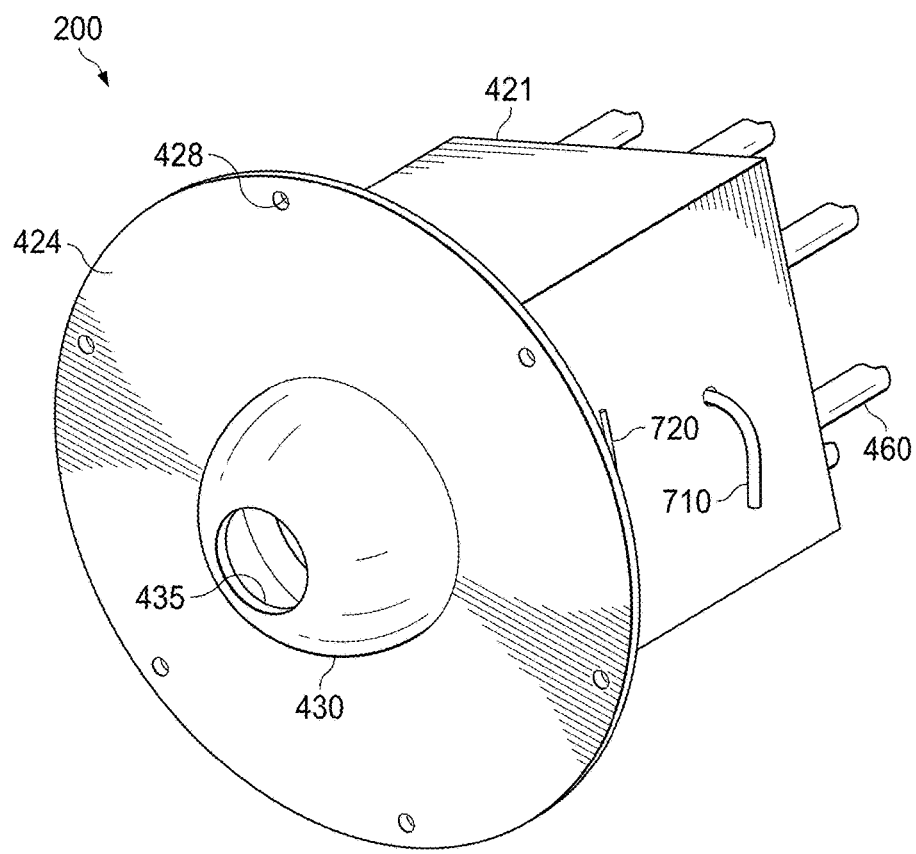
FIGS. 8A and 8B illustrate another blackbody according to embodiments of the present disclosure.
Figure 8B:
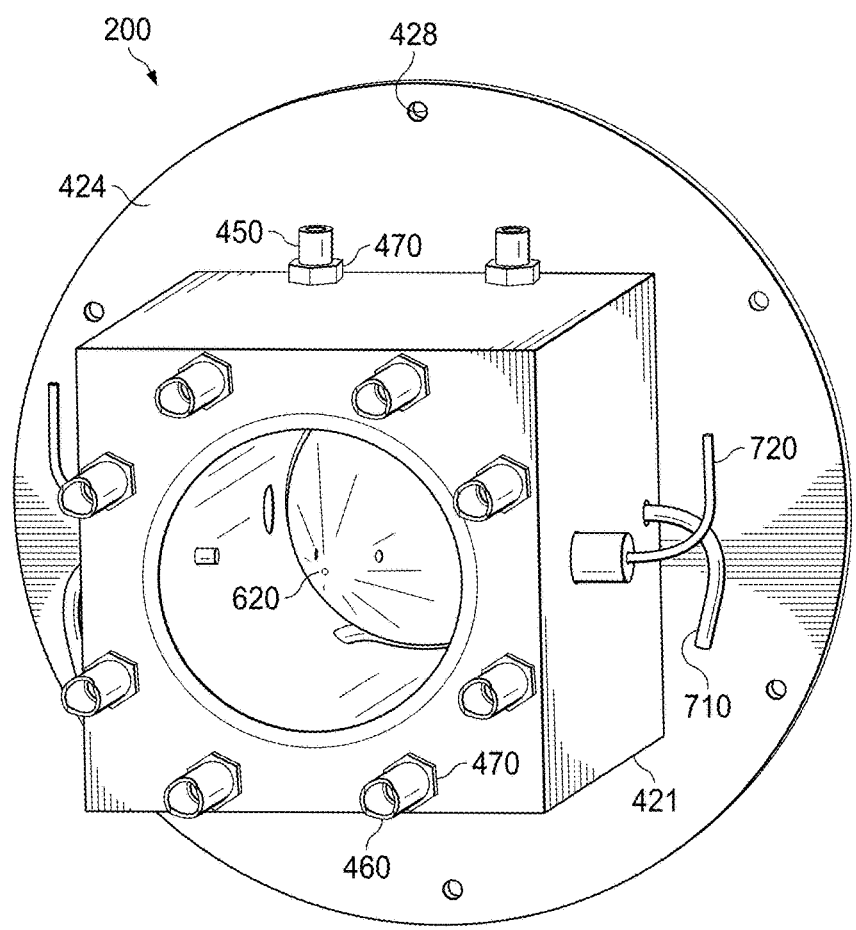

FIGS. 8A and 8B illustrate a blackbody 400 according to embodiments of the present disclosure with the heat exchanger 421 system shown. FIG. 8A illustrates an isometric view of the front of the blackbody 200. FIG. 8B illustrates a bottom view.

Correlating Infrared Emissivity

Figure 9:
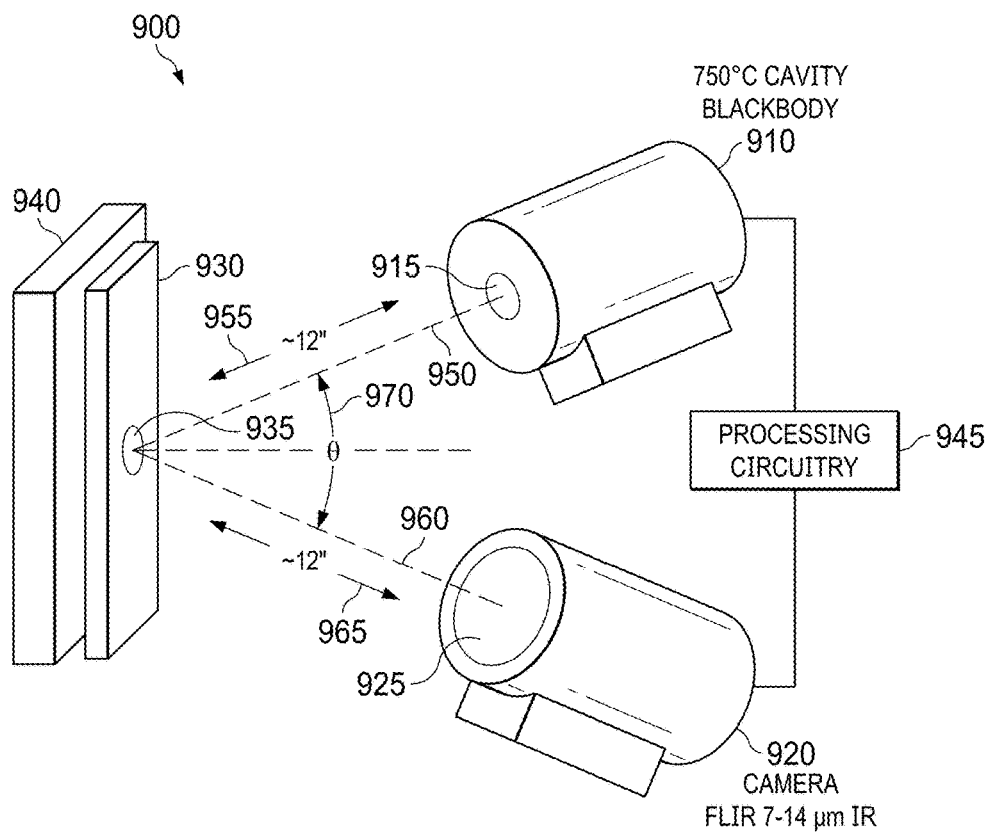
FIG. 9 illustrates a system for testing the IR emissivity of a material according to embodiments of the present disclosure.
Figure 9:
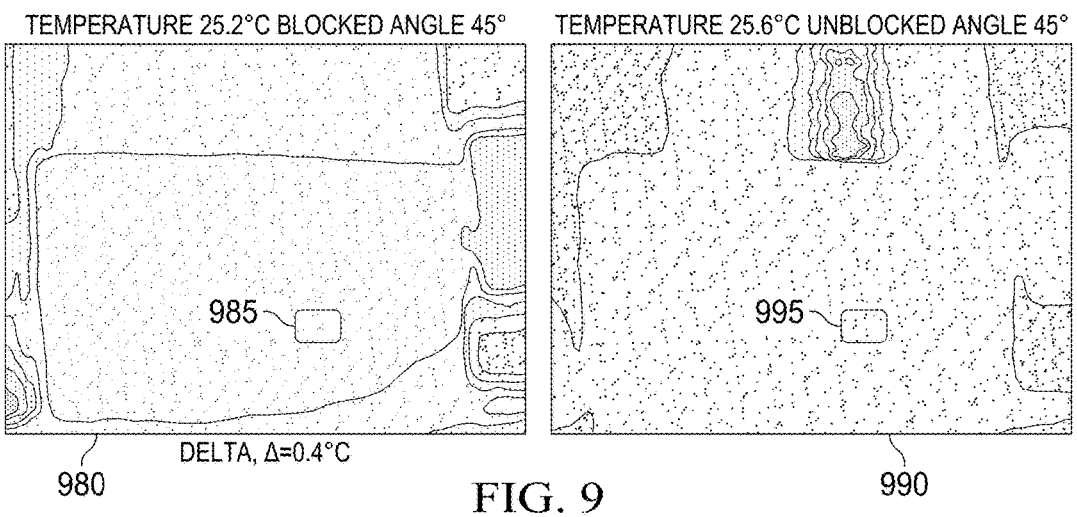

FIG. 9 illustrates a system 900 for testing the IR emissivity of a material according to embodiments of the present disclosure. In a specific example, the system 900 is configured to test the IR emissivity of a material to be used as the blackbody core 410.

The IR emissivity testing system 900 includes a heat source 910, an infrared camera 920, a sample material 930, a background material 940, and processing circuitry 945. In the example shown in FIG. 9 two displays of IR photographs are depicted, including a first image 980 of an unblocked sample material 930, and a second image 990 of a blocked sample material 930.

The heat source 910 includes a cavity 915 that heats up to a temperature within a range of 50° to 1050° Celsius. In certain embodiments, heat source 910 includes a cavity blackbody that is heated to a temperature of at least 750° C. The heat source 910 emits the heat in the form of light waves 950 (i.e., IR waves) that travel from the cavity 915 onto the surface 935 of the sample material 930.

The sample material 930 includes any real material. The sample material 930 includes a material from which the blackbody core 410 can be composed, such as Silicon Carbide (SiC).

The surface 935 of the sample material 930 is disposed a first distance 955 away from the heat source 910 and is disposed a second distance 965 away from the IR camera 920. In certain embodiments, the first distance 955 and second distance 965 are substantially equal, such as within one centimeter inclusive. In certain embodiments, the first and second distances are substantially equal to twelve (12) inches. The path of first distance 955 and the path of the second distance 965 emerge apart from each other at an angle 970 with a vertex at the center of the portion of the surface 935 of the sample material 930 where the light waves 950 are incident upon the surface 935. In certain embodiments, the angle 970 is approximately 50°, such as within 5 degrees inclusive.

When the heat source 910 is unblocked, the heat source 910 sends IR waves 950 toward the sample material 930, IR waves strike the surface 935 of the sample material and the background material 940. The sample material 935 reflects the IR waves into the lens 925 of the IR camera 920, as shown in element 995 of the IR photograph 990.

Alternatively, when the heat source 910 is blocked, the heat source does not send RF waves 950 toward the sample material 930. The only waves reflected into the lens 925 of the IR camera 920 are the IR waves emitted from the surface 935 of the sample material 930. For specific example of the ceramic material shown, no IR waves are reflected when the heat source 910 is blocked.

The background material 940 functions as a control within the system 900. Measurements of the light wave reflected off the background material 940 into the lens 925 of the IR camera 920 are used to control IR emissivity tests. The background material 940 is disposed behind or underneath the sample material 930. Therefore, the sample material 930 blocks light waves 950 from reaching a portion of the surface of the background material 940. The background material 940 includes a material that reflects IR energy. In certain embodiments, the background material 940 includes an aluminum plate.

The light waves 950 reflect off the surface 935 of sample material 930 along the path of the second distance 965 into the lens 925 of the IR camera. The infrared camera 920 captures a first IR photograph 980 that displays an IR color 985 of the surface of the sample material 930. The IR camera 920 sends signals to the processing circuitry 945 indicating the angle 970, the temperature of the surface 935 of the material, and an IR photograph including the temperature-color of the surface of the material.

The processing circuitry 945 is coupled to the IR camera 920. The processing circuitry 945 receives from the IR camera 920 a first IR photograph 980 of the blocked background material 940, the temperature of the background material 940, and the angle 970. The processing circuitry 945 displays the first IR photograph 980 of the surface of the background material (the unblocked image). The processing circuitry 945 also receives from the IR camera 920 the second IR photograph 990 of the sample material 930 blocking the energy from the IR cavity blackbody heat source 910, the temperature of the surface 940 of the sample material 930, and the angle 970. The processing circuitry 945 compares the temperature of the blocked image to the temperature of the unblocked images and calculates a difference (shown as delta=0.4° Celsius).

Figure 10:
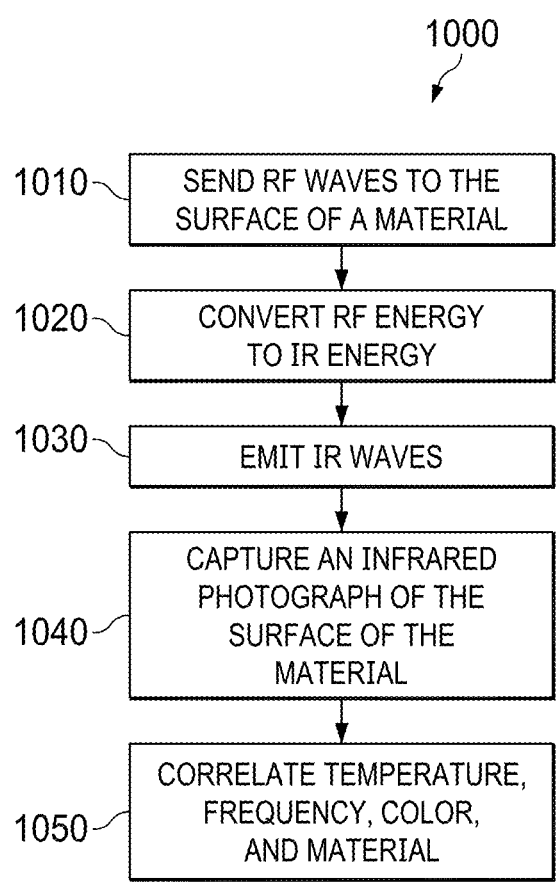
FIG. 10 illustrates a testing the IR emissivity of a material to be used as the blackbody core in accordance with embodiments of the present disclosure.

FIG. 10 illustrates a method 1000 for testing the IR emissivity of a material to be used as the blackbody core 410 according to embodiments of the present disclosure. The method 1000 can be implemented by system 900. In a specific example, the method 1000 tests the IR emissivity of a material to be used as the blackbody core 410.

The cavity blackbody heat source 910 sends energy in the form of IR waves 950 to the surface 935 of the sample material 930 in block 1010. In block 1020, in response to the impact of the IR waves upon the sample material 930, the sample material 930 absorbs the IR energy. Then, the sample material 930 emits IR waves 960 in block 1030. Also in block 1030, the IR waves travel from the surface of the sample material 930 into a lens 925 of the infrared camera 920. The infrared camera 920 captures an IR photograph of the heated surface 935 of the sample material 930 in block 1040.

In block 1050, the computer establishes an orderly connection and mutual relationship between the material of the sample material, the temperature of the sample material, the color of the sample material in the IR photograph. The components of the system 900 send the IR photograph and information related to the emissivity of the sample material 930 to the computer, which receives the photograph and information. The IR camera sends the IR photograph and the temperature of the sample material to the computer. User input to the computer identifies the material of the sample material 930 to the computer.

The method 1000 can be used to determine the resonant frequency for the sample material to the computer. The method 1000 can be performed iteratively to generate a Temperature as a function of Frequency graph for a band of RF frequencies applied to the same material, such as by applying a different RF frequency to the material in each iteration. The correlations generated within the method 1000 can be identified in block 215 of the method 200.

It is important to note that while the present disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the process 1000. Examples of machine usable, machine readable or computer usable, computer readable mediums include: non-volatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although various features have been shown in the figures and described above, various changes may be made to the figures. For example, the size, shape, arrangement, and layout of components shown in FIGS. 1 and 4 through 9 are for illustration only. Each component could have any suitable size, shape, and dimensions, and multiple components could have any suitable arrangement and layout. Also, various components in FIGS. 1 and 4 through 9 could be combined, further subdivided, or omitted and additional components could be added according to particular needs. Further, each component in a device or system could be implemented using any suitable structure(s) for performing the described function(s). In addition, while FIGS. 2 and 10 illustrate various series of steps, various steps in FIGS. 2 and 10 could overlap, occur in parallel, occur multiple times, or occur in a different order.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC § 112 unless the exact words "means for" are followed by a participle.

What is claimed is:

1. A blackbody comprising:
   a waveguide configured to propagate radio frequency (RF) waves of a specified frequency, the waveguide comprising a hollow propagation channel;
   an emitting core disposed in a fixed location within the hollow propagation channel of the waveguide, the emitting core configured to:
   receive the RF waves incident upon the emitting core, generate heat to raise a temperature of the emitting core, and
   emit infrared (IR) waves from the heated emitting core; and
   a spring system configured to clasp and mount the emitting core in the fixed location.

2. The blackbody of claim 1, further comprising a hood coupled to the waveguide and configured to:
   block at least some of the RF waves from exiting the waveguide,
   reflect the RF waves back onto the emitting core, and
   reflect errant IR waves back onto the emitting core, and
   wherein the hood comprises an aperture through which the IR waves exit.

3. The blackbody of claim 1, wherein the waveguide comprises highly reflective metal, and the hollow propagation channel comprises a polished metal interior surface.

4. The blackbody of claim 1, wherein the emitting core comprises a homogenous ceramic material.

5. The blackbody of claim 4, wherein the homogeneous ceramic material comprises silicon carbide.

6. The blackbody of claim 1, wherein the emitting core comprises an absorptive layer of a first homogenous ceramic material, and the absorptive layer comprises an exterior surface of the emitting core; and
   wherein the emitting core further comprises an emittive layer of a second homogenous ceramic material, and the emittive layer comprises an interior surface of the emitting core.

7. The blackbody of claim 1, wherein the emitting core comprises an opening angle of substantially twenty-five degrees.

8. The blackbody of claim 1, wherein the spring system comprises at least one pair of metal tubes, the tubes of each pair wrapped in opposite directions around a base of the emitting core within a recessed channel.

9. The blackbody of claim 1, wherein the spring system is further configured to inhibit a transfer of heat from the emitting core to the waveguide by conduction.

10. The blackbody of claim 1, wherein the spring system is further configured to act as a heat exchanger for the emitting core.

11. A non-contact method of heating an emitting core, the method comprising:
propagating radio frequency (RF) waves of a specified frequency in a waveguide, the waveguide comprising a hollow propagation channel;
receiving the RF waves incident upon the emitting core, wherein the emitting core is disposed in a fixed location within the hollow propagation channel of the waveguide;
in response to receiving the RF waves, generating, by the emitting core, heat to a temperature corresponding to a frequency of the RF waves;
converting RF energy to infrared (IR) energy by the emitting core;
emitting IR waves from the emitting core; and
clasping and mounting, by a spring system the emitting core in the fixed location;
wherein a resonant frequency of the RF waves corresponds to a material of which the emitting core is composed.

12. The method of claim 11, wherein the waveguide is coupled to a hood comprising an aperture through which the IR waves exit; and
the method further comprising:
blocking at least some of the RF waves from exiting the waveguide by the hood, and
reflecting the RF waves back onto the emitting core by the hood.

13. The method of claim 11, further comprising:
identifying the material of which the emitting core is composed; and
determining the resonant frequency corresponding to the identified material.

14. The method of claim 11, further comprising:
selecting one of a wavelength of the RF waves or a frequency of the RF waves; and
determining the temperature of the emitting core using one of the selected wavelength or the selected frequency.

15. The method of claim 11, further comprising:
selecting a desired temperature of the emitting core; and
determining the resonant frequency of the RF waves based on the desired temperature and the material of which the emitting core is composed.

16. The method of claim 11, further comprising measuring the temperature of the emitting core using an infrared sensor.

17. The method of claim 11, wherein the waveguide comprises aluminum, and the hollow propagation channel comprises a polished aluminum interior surface.

18. The method of claim 11, wherein the emitting core comprises a homogenous ceramic material.

19. The method of claim 18, wherein the homogeneous ceramic material comprises silicon carbide (SiC).

20. The method of claim 11, wherein the emitting core comprises an absorptive layer of a first homogenous ceramic material, and the absorptive layer comprises an exterior surface of the emitting core; and
wherein the emitting core further comprises an emittive layer of a second homogenous ceramic material, and the emittive layer comprises an interior surface of the emitting core.

21. The method of claim 11, wherein the emitting core comprises an opening angle of substantially twenty-five degrees.

22. The method of claim 11, wherein the spring system comprises at least one pair of metal tubes, the tubes of each pair wrapped in opposite directions around a base of the emitting core within a recessed channel.

23. The method of claim 11, further comprising:
inhibiting, by the spring system, a transfer of heat from the emitting core to the waveguide by conduction.

24. The method of claim 11, wherein the spring system is configured to act as a heat exchanger for the emitting core.

25. A non-contact method of heating an object disposed in a waveguide, the method comprising:
propagating radio frequency (RF) waves of a specified frequency;
receiving the RF waves incident upon the object;
heating the object to a desired temperature, the desired temperature corresponding to the specified frequency and an amplitude of the RF waves;
converting heat energy in the object to infrared (IR) energy; and
emitting the IR energy as IR waves from the object;
wherein the object does not transfer heat to the waveguide by conduction; and
wherein the object has a resonant frequency based on the specified frequency of the RF waves incident upon the object.

26. The method of claim 25, further comprising:
identifying a material of which the object is composed; and
determining the resonant frequency corresponding to the identified material.

27. The method of claim 25, further comprising:
selecting one of a wavelength of the RF waves or a frequency of the RF waves; and
determining the temperature of the object using one of the selected wavelength or the selected frequency and the amplitude of the RF waves.

28. The method of claim 25, further comprising:
selecting the desired temperature of the object; and
determining the resonant frequency based on the desired temperature and the material of which the object is composed.

29. The method of claim 25, further comprising measuring an emissivity of the object using an infrared sensor.

* * * * *